US011955287B2

(12) United States Patent
Lee et al.

(10) Patent No.: US 11,955,287 B2
(45) Date of Patent: Apr. 9, 2024

(54) MULTILAYER ELECTRONIC COMPONENT

(71) Applicant: SAMSUNG ELECTRO-MECHANICS CO., LTD., Suwon-si (KR)

(72) Inventors: Jang Yeol Lee, Suwon-si (KR); Hye Min Bang, Suwon-si (KR); Bum Soo Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 54 days.

(21) Appl. No.: 17/545,289

(22) Filed: Dec. 8, 2021

(65) Prior Publication Data

US 2022/0189700 A1     Jun. 16, 2022

(30) Foreign Application Priority Data

Dec. 14, 2020   (KR) .................. 10-2020-0174544

(51) Int. Cl.
  *H01G 4/30*     (2006.01)
  *H01G 4/232*    (2006.01)
  *H01G 4/248*    (2006.01)

(52) U.S. Cl.
  CPC .............. *H01G 4/30* (2013.01); *H01G 4/232* (2013.01); *H01G 4/248* (2013.01)

(58) Field of Classification Search
  CPC .......... H01G 4/30; H01G 4/232; H01G 4/248; H01G 4/005
  USPC ..................... 361/301.4, 321.1, 306.3, 321.3
  See application file for complete search history.

(56) References Cited

U.S. PATENT DOCUMENTS

| 8,988,850 | B1  | 3/2015  | Kodama et al. | |
|---|---|---|---|---|
| 2014/0002950 | A1* | 1/2014 | Gu | H01G 4/005 29/25.42 |
| 2015/0043124 | A1* | 2/2015 | Kim | H01G 4/232 361/301.4 |
| 2017/0250027 | A1* | 8/2017 | Kowase | H01G 4/12 |
| 2018/0174753 | A1* | 6/2018 | Terashita | H01G 4/008 |
| 2019/0180938 | A1* | 6/2019 | Tahara | H01G 4/248 |
| 2019/0326058 | A1* | 10/2019 | Lee | H01G 4/30 |
| 2019/0355518 | A1* | 11/2019 | Harada | H01G 4/30 |
| 2020/0075243 | A1* | 3/2020 | Park | H01G 4/012 |
| 2020/0082983 | A1  | 3/2020 | Kim et al. | |
| 2020/0312550 | A1* | 10/2020 | Nagai | H01G 4/33 |
| 2020/0411245 | A1  | 12/2020 | Lee et al. | |
| 2021/0020378 | A1* | 1/2021 | Fukuma | H01G 4/224 |

FOREIGN PATENT DOCUMENTS

| JP | 2000-049032 A | 2/2000 |
|---|---|---|
| KR | 10-2015-0048045 A | 5/2015 |
| KR | 10-2019-0116117 A | 10/2019 |

(Continued)

*Primary Examiner* — Arun Ramaswamy
(74) *Attorney, Agent, or Firm* — MORGAN, LEWIS & BOCKIUS LLP

(57) ABSTRACT

A multilayer electronic component includes: a body including an active portion including internal electrodes disposed alternately with dielectric layers and cover portions disposed on upper and lower surfaces of the active portion; and external electrodes including an electrode layer disposed on the body, and an average thickness of the cover portion is 14 to 17 μm and a maximum thickness of the electrode layer is 5 to 20 μm.

19 Claims, 6 Drawing Sheets

(56) References Cited

FOREIGN PATENT DOCUMENTS

| | | | | |
|---|---|---|---|---|
| KR | 10-2019-0121163 A | 10/2019 | | |
| KR | 10-2019-0121176 A | 10/2019 | | |
| KR | 2019116117 A | * 10/2019 | ............. | H01G 4/005 |

* cited by examiner

MULTILAYER ELECTRONIC COMPONENT

CROSS-REFERENCE TO RELATED APPLICATION(S)

This application claims the benefit of priority to Korean Patent Application No. 10-2020-0174544 filed on Dec. 14, 2020 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of several electronic products such as an image display devices, for example, a liquid crystal display (LCD), a plasma display panel (PDP) or the like, a computer, a smartphone, a mobile phone, and the like, to serve to charge or discharge electricity therein or therefrom.

The multilayer ceramic capacitor may be used as components of various electronic apparatuses since it has a small size, implements high capacitance, and may be easily mounted. In accordance with miniaturization and an increase in output of various electronic apparatuses such as computers and mobile devices, a demand for miniaturization and a capacitance increase of the multilayer ceramic capacitors has increased.

In addition, recently, in accordance with an increase in an interest in electronic components for a vehicle in the industry, the multilayer ceramic capacitors have also been required to have high reliability and high strength characteristics in order to be used in the vehicle or an infotainment system.

In order to miniaturize the multilayer ceramic capacitor and increase capacitance of the multilayer ceramic capacitor, it has been required to significantly increase an electrode effective area (increase an effective volume fraction required for implementing capacitance).

Meanwhile, a radial cracking in the multilayer ceramic capacitor may occur due to stress generated in a process of firing an external electrode after a paste for the external electrode is applied. In addition, as thicknesses of the external electrode, a cover portion, and a margin portion gradually decrease, reliability of the multilayer ceramic capacitor such as moisture resistance reliability may decrease.

SUMMARY

Another aspect of the present disclosure may provide a multilayer electronic component in which reliability is improved.

Another aspect of the present disclosure may provide a multilayer electronic component in which radial cracking is suppressed.

Another aspect of the present disclosure may provide a multilayer electronic component in which an effective volume is increased.

According to an aspect of the present disclosure, a multilayer electronic component may include: a body including a plurality of dielectric layers and having first and second surfaces opposing each other in a first direction, third and fourth surfaces connected to the first and second surfaces and opposing each other in a second direction, and fifth and sixth surfaces connected to the first to fourth surfaces and opposing each other in a third direction; and external electrodes disposed on the third and fourth surfaces, respectively, and including electrode layers, respectively, wherein the body includes an active portion including internal electrodes disposed alternately with the dielectric layers and cover portions disposed on upper and lower surfaces of the active portion in the first direction, respectively, and in a cross-section of the body cut in the first and second directions in a center of the body in the third direction, an average thickness of the cover portion is 14 to 17 µm and a maximum thickness of the electrode layer is 5 to 20 µm.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
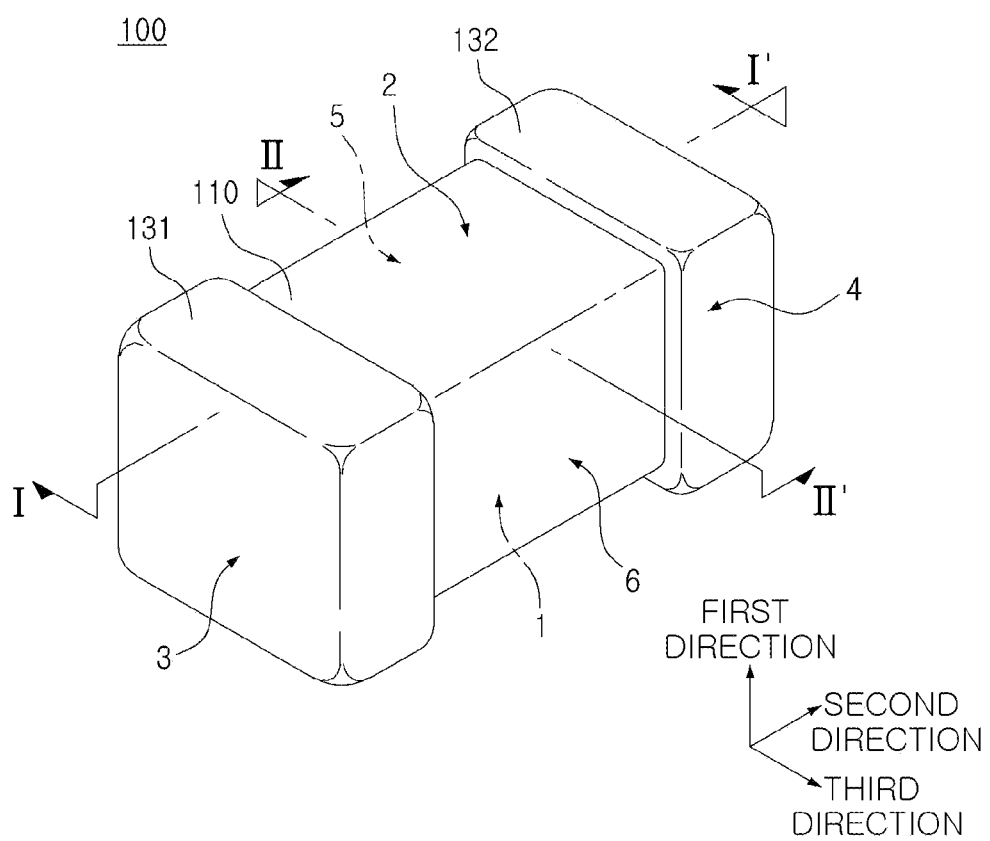
FIG. 1 is a schematic perspective view illustrating a multilayer electronic component according to an exemplary embodiment in the present disclosure.

Hereinafter, exemplary embodiments of the present disclosure will now be described in detail with reference to the accompanying drawings. The shape and size of constituent elements in the drawings may be exaggerated or reduced for clarity. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

The contents of the present disclosure described below may have a variety of configurations and propose only a required configuration herein, but are not limited thereto.

In the drawings, a first direction may be defined as a stacked direction or a thickness T direction, a second direction may be defined as a length L direction, and a third direction may be defined as a width W direction.

Multilayer Electronic Component

FIG. 1 is a schematic perspective view illustrating a multilayer electronic component according to an exemplary embodiment in the present disclosure.

Figure 2:
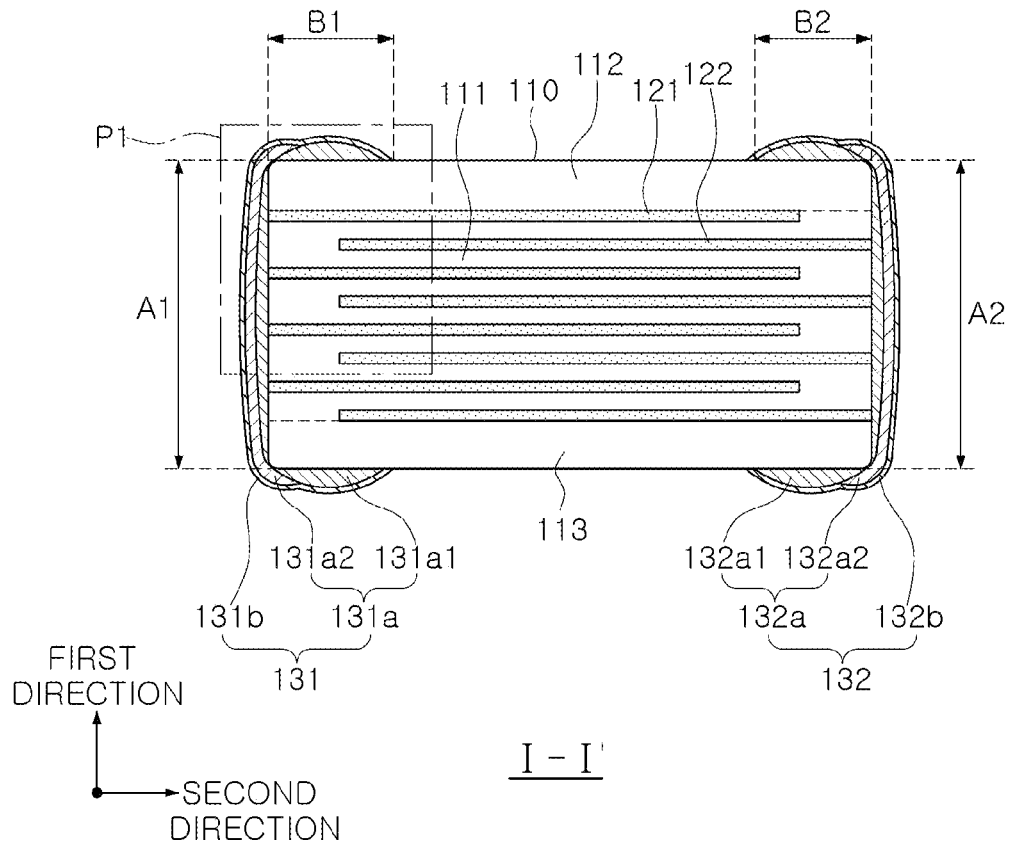
FIG. 2 is a cross-sectional view taken along line I-I' of FIG. 1.

FIG. 2 is a cross-sectional view taken along line I-I' of FIG. 1.

Figure 3:
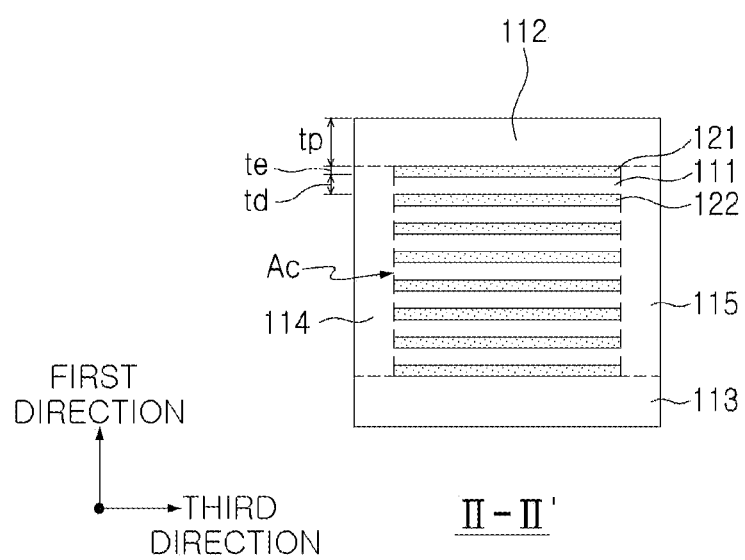
FIG. 3 is a cross-sectional view taken along line II-II' of FIG. 1.

FIG. 3 is a cross-sectional view taken along line II-II' of FIG. 1.

Figure 4:
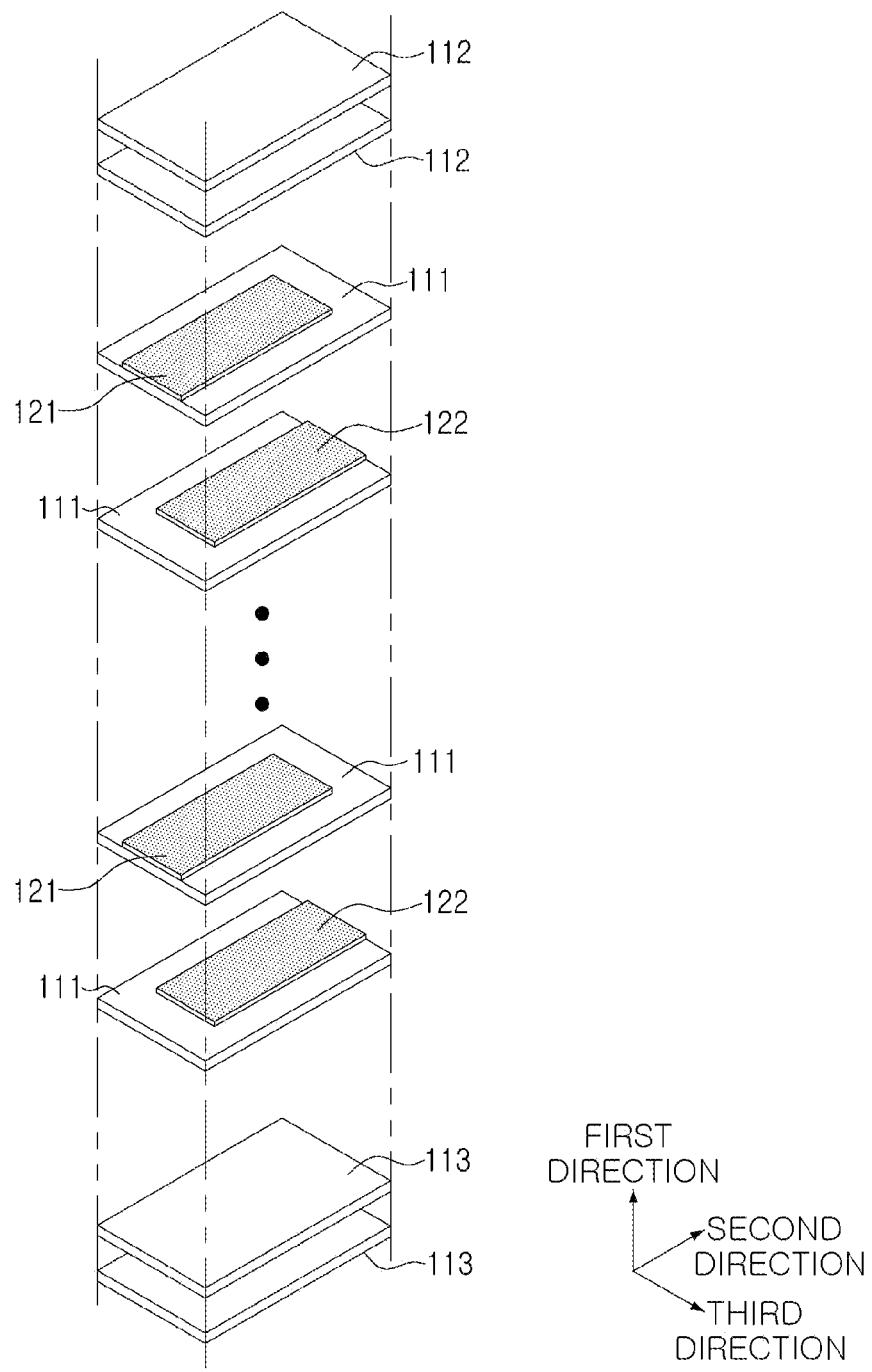
FIG. 4 is a schematic exploded perspective view illustrating a body in which dielectric layers and internal electrodes are stacked according to an exemplary embodiment in the present disclosure.

FIG. 4 is a schematic exploded perspective view illustrating a body in which dielectric layers and internal electrodes are stacked according to an exemplary embodiment in the present disclosure.

Figure 5:
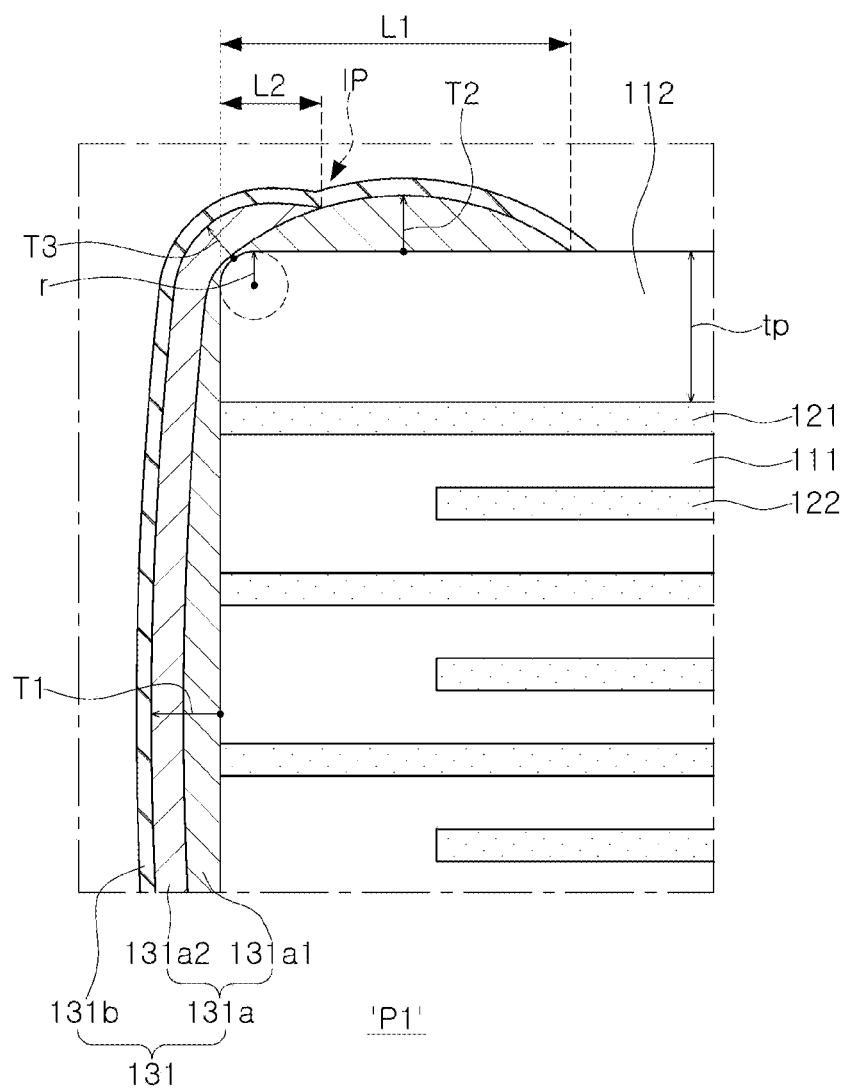
FIG. 5 is an enlarged view of region P1 of FIG. 2.

FIG. 5 is an enlarged view of region P1 of FIG. 2.

Hereinafter, a multilayer electronic component 100 according to an exemplary embodiment in the present disclosure will be described with reference to FIGS. 1 through 5.

The multilayer electronic component 100 according to an exemplary embodiment in the present disclosure may include: a body 110 including a plurality of dielectric layers 111 and having first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction; and external electrodes 131 and 132 disposed on third and fourth surfaces, respectively and including electrode layers 131a and 132a, respectively, wherein the body includes an active portion Ac including internal electrodes 121 and 122 disposed alternately with the dielectric layers and cover portions 112 and 113 disposed on upper and lower surfaces of the active portion in the first direction, respectively, and in a cross-section of the body cut in the first and second directions at the center of the body in the third direction, an average thickness tp of the cover portion is 14 to 17 μm and a maximum thickness T1 of the electrode layer is 5 to 20 μm.

The body 110 may include the dielectric layers 111 and the internal electrodes 121 and 122 alternately stacked therein.

A shape of the body 110 is not particularly limited, and may be a hexahedral shape or a shape similar to the hexahedral shape, as illustrated in the drawings. Although the body 110 does not have a hexahedral shape having perfectly straight lines due to shrinkage of ceramic powders included in the body 110 in a sintering process, the body 110 may have a substantially hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

The plurality of dielectric layers 111 forming the body 110 may be in a sintered state, and adjacent dielectric layers 111 may be integrated with each other so that boundaries therebetween are not readily apparent without using a scanning electron microscope (SEM).

According to an exemplary embodiment in the present disclosure, a raw material of the dielectric layer 111 is not particularly limited as long as sufficient capacitance may be obtained. For example, a barium titanate-based material, a lead composite perovskite-based material, a strontium titanate-based material, or the like, may be used as the raw material of the dielectric layer 111. The barium titanate-based material may include $BaTiO_3$-based ceramic powders. Examples of the $BaTiO_3$-based ceramic powders may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like, is partially solid-dissolved in $BaTiO_3$.

In addition, a raw material of the dielectric layer 111 may include various ceramic additives, organic solvents, binders, dispersants, and the like, added to powders such as barium titanate ($BaTiO_3$) powders, or the like, according to an object of the present disclosure.

Meanwhile, a thickness td of the dielectric layer 111 does not need to be particularly limited.

However, in general, when the dielectric layer 111 is formed to have a small thickness less than 0.6 μm, in particular, when a thickness of the dielectric layer 111 is 0.5 μm or less, reliability of the multilayer electronic component may be decreased.

As described later, according to an exemplary embodiment in the present disclosure, a radial cracking of the multilayer electronic component may be suppressed and moisture resistance reliability of the multilayer electronic component by adjusting thicknesses of the cover portion and the external electrode, and sufficient reliability of the multilayer electronic component may thus be secured even when the thickness td of the dielectric layer 111 is 0.5 μm or less.

Therefore, when the thickness td of the dielectric layer 111 is 0.5 μm or less, a reliability improving effect of the multilayer electronic component according to the present disclosure may become more remarkable.

The thickness td of the dielectric layer 111 may refer to an average thickness of the dielectric layer 111 disposed between the first and second internal electrodes 121 and 122.

The average thickness of the dielectric layer 111 may be measured from an image obtained by scanning a cross-section of the body 110 in the length and thickness directions (L-T) with a scanning electron microscope (SEM).

For example, with respect to any dielectric layer extracted from an image obtained by scanning a cross-section of the body 110 in the first and second directions (the length and thickness directions) cut at a central portion of the body 110 in the third direction (the width W direction) with the scanning electron microscope (SEM), thicknesses of the dielectric layer may be measured at thirty points arranged at equal intervals in the length direction to obtain an average value of the measured thicknesses.

The thicknesses of the dielectric layer measured at the thirty points arranged at the equal intervals may be measured in the active portion Ac referring to a region in which the first and second internal electrodes 121 and 122 overlap each other.

The body 110 may include the active portion Ac disposed in the body 110 and forming capacitance by including the first internal electrodes 121 and second internal electrodes 122 disposed to face each other with each of the dielectric layers 111 interposed therebetween and the cover portions 112 and 113 formed on the upper and lower surfaces of the active portion Ac in the first direction, respectively.

In addition, the active portion Ac, which contributes to forming capacitance of a multilayer ceramic capacitor, may be formed by repeatedly stacking a plurality of first and second internal electrodes 121 and 122 with each of the dielectric layers 111 interposed therebetween.

The cover portions 112 and 113 may include an upper cover portion 112 disposed on the upper surface of the active portion Ac in the first direction and a lower cover portion 113 disposed on the lower surface of the active portion Ac in the first direction.

The upper cover portion 112 and the lower cover portion 113 may be formed by stacking a single dielectric layer or two or more dielectric layers on the upper and lower surfaces of the active portion Ac in the thickness direction, respectively, and may basically serve to prevent damage to the internal electrodes due to physical or chemical stress.

The upper cover portion 112 and the lower cover portion 113 may not include the internal electrodes, and may include the same material as the dielectric layer 111.

That is, the upper cover portion 112 and the lower cover portion 113 may include a ceramic material such as a barium titanate ($BaTiO_3$)-based ceramic material.

In addition, margin portions 114 and 115 may be disposed on side surfaces of the active portion Ac.

The margin portions 114 and 115 may include a margin portion 114 disposed on the fifth surface 5 of the body 110 and a margin portion 115 disposed on the sixth surface 6. That is, the margin portions 114 and 115 may be disposed on opposite side surfaces of the ceramic body 110 in the width direction.

The margin portions 114 and 115 refer to regions between both distal ends of the first and second internal electrodes 121 and 122 and boundary surfaces of the body 110 in a cross-section of the body 110 cut in the width-thickness (W-T) direction, as illustrated in FIG. 3.

The margin portions 114 and 115 may serve to prevent damage to the internal electrodes due to physical or chemical stress.

The margin portions 114 and 115 may be formed by applying a conductive paste onto ceramic green sheets except for places where the margin portions are to be formed to form the internal electrodes.

Alternatively, in order to suppress a step due to the internal electrodes 121 and 122, the margin portions 114 and 115 may be formed by stacking ceramic green sheets to form a laminate, cutting the laminate so that the internal electrodes are exposed to the fifth and sixth surfaces 5 and 6 of the body, and then stacking a single dielectric layer or two or more dielectric layers on opposite side surfaces of the active portion Ac in the width direction.

The internal electrodes 121 and 122 may be stacked alternately with the dielectric layer 111.

The internal electrodes 121 and 122 may include first and second internal electrodes 121 and 122. The first and second internal electrodes 121 and 122 may be alternately disposed to face each other with each of the dielectric layers 111 constituting the body 110 interposed therebetween, and may be exposed to the third and fourth surfaces 3 and 4 of the body 110, respectively.

Referring to FIG. 2, the first internal electrodes 121 may be spaced apart from the fourth surface 4 and be exposed through the third surface 3, and the second internal electrodes 122 may be spaced apart from the third surface 3 and be exposed through the fourth surface 4. The first external electrode 131 may be disposed on the third surface 3 of the body and be connected to the first internal electrodes 121, and the second external electrode 132 may be disposed on the fourth surface 4 of the body and be connected to the second internal electrodes 122.

That is, the first internal electrodes 121 are not connected to the second external electrode 132, and may be connected to the first external electrode 131, and the second internal electrodes 122 are not connected to the first external electrode 131, and may be connected to the second external electrode 132. Therefore, the first internal electrodes 121 may be spaced apart from the fourth surface 4 by a predetermined distance, and the second internal electrodes 122 may be spaced apart from the third surface 3 by a predetermined distance.

In this case, the first and second internal electrodes 121 and 122 may be electrically separated from each other by each of the dielectric layers 111 disposed therebetween.

Referring to FIG. 4, the body 110 may be formed by alternately stacking ceramic green sheets on which the first internal electrode 121 is printed and ceramic green sheets on which the second internal electrode 122 is printed and then sintering the stacked ceramic green sheets.

A material of each of the internal electrodes 121 and 122 is not particularly limited, and may be a material having excellent electrical conductivity. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for an internal electrode including one or more of nickel (Ni), copper (Cu), palladium (Pd), silver (Ag), gold (Au), platinum (Pt), tin (Sn), tungsten (W), titanium (Ti), and alloys thereof on ceramic green sheets. A method of printing the conductive paste for an internal electrode may be a screen printing method, a gravure printing method or the like, but is not limited thereto.

Meanwhile, a thickness te of the internal electrodes 121 and 122 does not need to be particularly limited.

However, in general, when the internal electrodes 121 and 122 are formed to have a small thickness less than 0.6 μm, in particular, when a thickness of each of the internal electrodes 121 and 122 is 0.5 μm or less, reliability of the multilayer electronic component may be decreased.

As described later, according to an exemplary embodiment in the present disclosure, a radial cracking of the multilayer electronic component may be suppressed and moisture resistance reliability of the multilayer electronic component by adjusting thicknesses of the cover portion and the external electrode, and sufficient reliability of the multilayer electronic component may thus be secured even when the thickness te of the internal electrodes 121 and 122 is 0.5 μm or less.

Therefore, when the thickness te of the internal electrodes 121 and 122 is 0.5 μm or less, an effect of the multilayer electronic component according to the present disclosure may become more remarkable, and miniaturization and a capacitance increase of the multilayer electronic component may be more easily achieved.

The external electrodes 131 and 132 may be disposed on the third surface 3 and the fourth surface 4 of the body 110, respectively, and may include the electrode layers 131a and 132, respectively.

The external electrodes 131 and 132 may include the first and second external electrodes 131 and 132 disposed on the third and fourth surfaces 3 and 4 of the body 110, respectively, and connected to the first and second internal electrodes 121 and 122, respectively.

In the cross-section of the body cut in the first and second directions at the center of the body in the third direction, the average thickness tp of the cover portion may be 14 to 17 μm and the maximum thickness T1 of the electrode layer may be 5 to 20 μm. In this case, the average thickness tp of the cover portion may refer to an average value of values measured at ten points arranged at equal intervals. In addition, the maximum thickness T1 of the electrode layer may be a thickness measured at a central portion of the body in the first direction.

In order to increase an effective volume, a volume occupied by the active portion Ac needs to be increased by decreasing the average thickness tp of the cover portion.

When the average thickness tp of the cover portion exceeds 17 μm, the effective volume may be decreased, and when the average thickness tp of the cover portion is less than 14 μm, it may be difficult to prevent damage to the internal electrodes due to physical or chemical stress. Therefore, the average thickness tp of the cover portion may be 14 μm or more and 17 μm or less.

When the thickness of the cover portion is decreased in order to increase the effective volume, a thickness of the external electrode may be relatively increased, such that a radial cracking may occur in the multilayer electronic component due to stress generated in a process of firing the external electrode after applying a paste for the external electrode. That is, the radial cracking needs to be suppressed by setting an upper limit of the thickness of the external electrode with respect to the thickness of the cover portion. When the thickness of the cover portion is 14 to 17 μm, when the thickness T1 of the electrode layer exceeds 20 μm, the radial cracking may occur. Therefore, an upper limit of the thickness T1 of the electrode layer may be 20 μm.

On the other hand, when the thickness T1 of the electrode layer is excessively small, moisture may permeate into the electrode layer due to an increase in water vapor transmission rate, such that moisture resistance reliability of the multilayer electronic component may be decreased.

Figure 7:
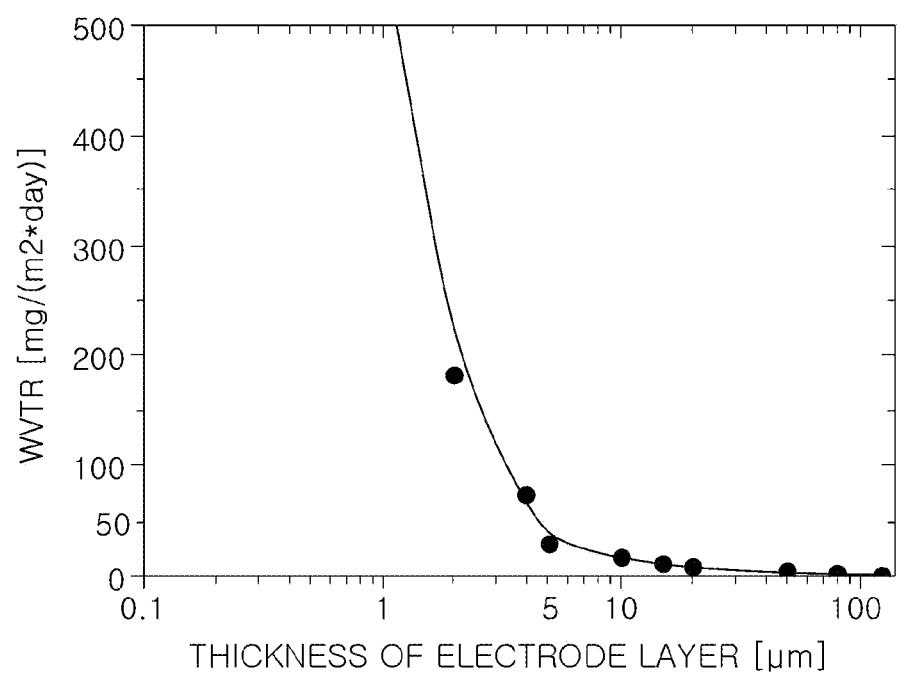
FIG. 7 is a graph illustrating a water vapor transmission rate depending on a thickness of an electrode layer of an external electrode.

FIG. 7 is a graph illustrating a water vapor transmission rate depending on a thickness of an electrode layer of an external electrode. Referring to FIG. 7, when the thickness T1 of the electrode layer is less than 5 μm, a water vapor transmission rate (WVTR) may become 50 mg/(m2*day) or more, such that moisture penetration into the electrode layer may become easy, and moisture resistance reliability of the multilayer electronic component may thus be decreased. In addition, it may be confirmed that the thickness T1 of the electrode layer becomes less than 5 μm, the water vapor transmission rate of the multilayer electronic component rapidly increases. Therefore, a lower limit of the thickness T1 of the electrode layer may be 5 μm.

Dividing a region of the first external electrodes 131 according to disposition positions of the first external electrode 131 with reference to FIG. 2, the first external electrodes 131 may include a first connection portion A1 disposed on the third surface 3 of the body and a first band portion B1 extending from the first connection portion A1 to parts of the first and second surfaces 1 and 2.

Dividing a region of the second external electrode 132 according to disposition positions of the second external electrode 132, the second external electrodes 132 may include a second connection portion A2 disposed on the fourth surface 4 of the body and a second band portion B2 extending from the second connection portion A2 to parts of the first and second surfaces 1 and 2.

In addition, regions in which the connection portions A1 and A2 are connected to the band portions B1 and B2, respectively, may be referred to as corner portions.

In an exemplary embodiment, the electrode layers 131a and 132a may include, respectively, first electrode layers 131a1 and 132a1 connected to the internal electrodes 121 and 122, respectively, and second electrode layers 131a2 and 132a2 disposed on the first electrode layers, respectively.

As the thicknesses of the electrode layers 131a and 132a are decreased, disconnections of the electrode layers and/or plating layers may occur at the corner portions of the body and act as moisture penetration paths, such that moisture resistance reliability of the multilayer electronic component may be decreased. Therefore, in order to form the electrode layers 131a and 132a at a predetermined thickness or more at the corner portions while making the electrode layers 131a and 132a thin, the electrode layers may be formed by applying a paste for the external electrode twice or more.

In this case, each of the first electrode layers 131a1 and 132a1 and the second electrode layers 131a2 and 132a2 may include a conductive metal and glass.

The conductive metal used for the electrode layers 131a and 132a is not particularly limited as long as it is any material that may be electrically connected to the internal electrodes in order to form capacitance, and may include, for example, one or more selected from the group consisting of nickel (Ni), copper (Cu), palladium (Pd), silver (Ag), gold (Au), platinum (Pt), tin (Sn), tungsten (W), titanium (Ti), and alloys thereof.

The electrode layers 131a and 132a may be formed by applying and then firing a conductive paste prepared by adding glass frit to conductive metal powders.

When the electrode layers 131a and 132a are fired electrodes including a conductive metal and glass, the electrode layers 131a and 132a may be generally formed in a dipping manner, and disconnections of the electrode layers and/or the plating layers at corner portions may thus occur easily. Therefore, when the electrode layers 131a and 132a are the fired electrodes including the conductive metal and the glass, the electrode layers 131a and 132a may be formed at a predetermined thickness or more at the corner portions while being made to be thin by applying the paste for the external electrode twice or more.

In an exemplary embodiment, in the first band portion B1, a length L1 from the third surface to a distal end of the first electrode layer 131a1 may be greater than a length L2 from the third surface to a distal end of the second electrode layer 131a2.

Therefore, the electrode layers 131a and 132a may have a thickness T3 secured as a predetermined thickness or more at the corner portions while having a small thickness at the band portions B1 and B2, such that moisture resistance reliability of the multilayer electronic component may be improved.

In an exemplary embodiment, in the first and second band portions B1 and B2, at least one point IP at which inclinations of tangent lines of the electrode layers 131a and 132a are opposite to each other may be disposed.

At least one point IP at which the inclinations of the tangent lines are opposite to each other may be disposed, such that the electrode layers 131a and 132a disposed at the corner portions of the body 110 may not be disconnected, and moisture resistance characteristics of the multilayer electronic component may be improved and reliability of the multilayer electronic component may thus be improved.

In an exemplary embodiment, the second electrode layer 131a2 may be disposed to cover the corner portion, which is a region in which the first band portion B1 and the first connection portion A1 are connected to each other. The second electrode layer 131a2 may be disposed to cover the corner portion, and may thus prevent external moisture and a plating solution that may permeate into the corner portion due to multiple applications to improve moisture resistance reliability.

In this case, a thickness T3 of each of the electrode layers 131a and 132a at the corner portions may be 1.0 μm or more.

A depth at which the glass is chemically etched by a plating solution during a plating process may be about 0.5 to 1.0 μm. Therefore, considering a glass etching depth, when the thickness T3 of each of the electrode layers 131a and 132a at the corner portions is 1.0 μm or more, a disconnection of the electrode layer and permeation of the plating solution may be prevented.

The thickness T3 of each of the electrode layers 131a and 132a at the corner portions may be a thickness measured in a direction perpendicular to the tangent line.

In addition, the corner portion of the body may have a rounded shape, and a radius of curvature r of the rounded shape may be 5 to 30 μm. Therefore, the thickness T3 of each of the electrode layers 131a and 132a at the corner portions may be more easily secured.

In an exemplary embodiment, in the first and second band portions B1 and B2, at least one point IP at which inclinations of tangent lines of the electrode layers 131a and 132a are opposite to each other may be disposed.

At least one point IP at which the inclinations of the tangent lines are opposite to each other may be disposed, such that the electrode layers 131a and 132a disposed at the corner portions of the body 110 may not be disconnected, and moisture resistance characteristics of the multilayer electronic component may be improved and reliability of the multilayer electronic component may thus be improved.

In an exemplary embodiment, in the first band portion B1, a maximum thickness of the electrode layer 131a may be 5 to 12 μm.

Plating layers 131b and 132b may be disposed on the electrode layers 131a and 132a, respectively.

The plating layers 131b and 132b may basically serve to improve mounting characteristics of the multilayer electronic component. A type of the plating layers 131b and 132b is not particularly limited. That is, each of the plating layers 131b and 132b may be a plating layer including one or more of Ni, Sn, Pd, and alloys thereof, and may be formed as a plurality of layers.

As a more specific example of the plating layers 131b and 132b, the plating layers 131b and 132b may be Ni plating layers or Sn plating layers, and may have a form in which Ni plating layers and Sn plating layers are sequentially formed on the electrode layers 131a and 132a, respectively. However, the plating layers 131b and 132b are not limited thereto, and may have a form in which Sn plating layers, Ni plating layers, and Sn plating layers are sequentially formed or may include a plurality of Ni plating layers and/or a plurality of Sn plating layers.

As a size of the multilayer electronic component 100 decreases, thicknesses of the external electrode, the cover portion, and the margin portion may gradually decrease, and an effect according to the present disclosure may thus become more remarkable. In a multilayer electronic component 100 having a size of 1005 (length×width: 1.0 mm×0.5 mm) or less, effects such as a radial cracking suppressing effect, a reliability improving effect and the like according to the present disclosure may become remarkable. In particular, in a multilayer electronic component 100 having a size of 0402 (length×width: 0.4 mm×0.2 mm) or less, effects such as a radial cracking suppressing effect, a reliability improving effect and the like according to the present disclosure may become more remarkable.

Therefore, considering a manufacturing error, a size of an external electrode, and the like, a size of the multilayer electronic component 100 in the second direction may be 1.1 mm or less and a size of the multilayer electronic component 100 in the third direction may be 0.55 mm or less. More preferably, a size of the multilayer electronic component 100 in the second direction may be 0.44 mm or less and a size of the multilayer electronic component 100 in the third direction may be 0.22 mm or less. In this case, the size of the multilayer electronic component in the second direction may refer to a maximum length of the multilayer electronic component, and the size of the multilayer electronic component in the third direction may refer to a maximum width of the multilayer electronic component.

Figure 6:
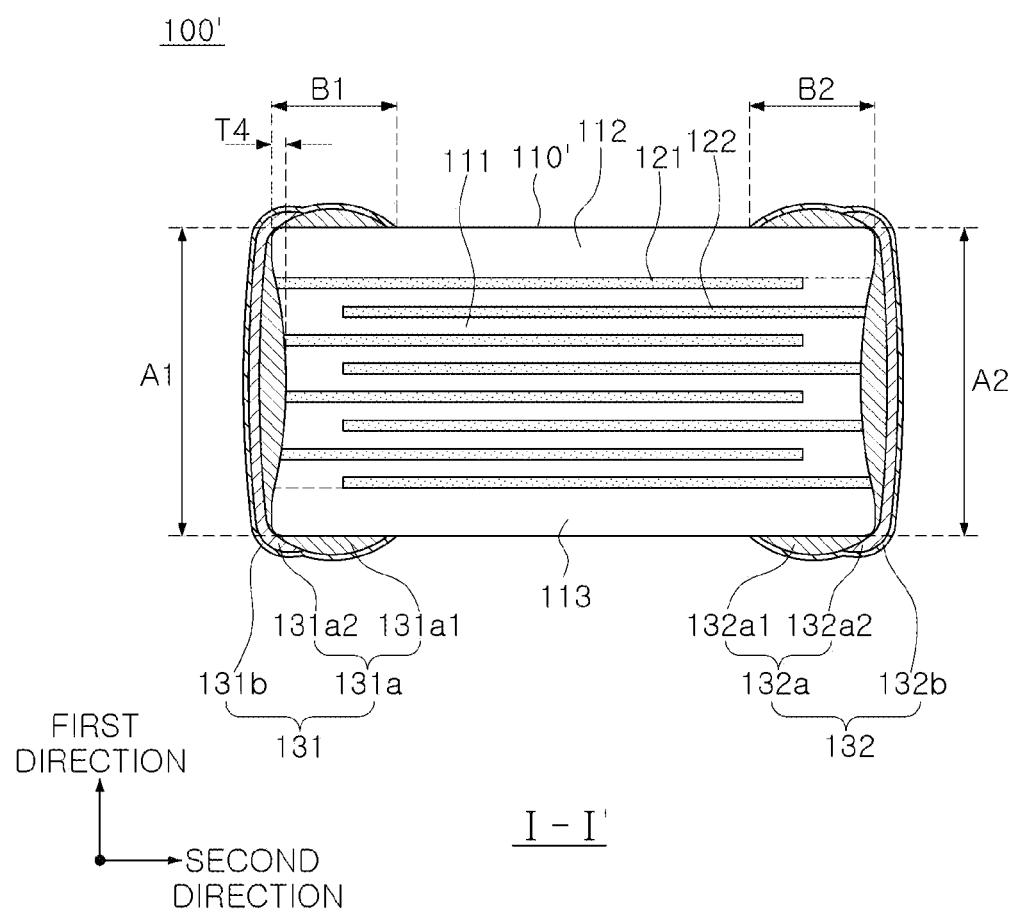
FIG. 6 is a cross-sectional view taken along line I-I' of FIG. 1 according to a modified example of an exemplary embodiment in the present disclosure.

FIG. 6 is a cross-sectional view taken along line I-I' of FIG. 1 according to a modified example of an exemplary embodiment in the present disclosure.

Referring to FIG. 6, third and fourth surfaces of a body may have a concave shape. That is, a size of the body 100' in the second direction may gradually decrease toward a central portion of the body in the first direction. Since the third and fourth surfaces have the concave shape, a decrease in a thickness of an external electrode may be more easily achieved, and a thickness of the external electrode at a corner portion may also be more easily secured.

In this case, a depth T4 of the concave shape may be 5 to 10 μm. When T4 is less than 5 μm, an effect may be insufficient, and when T4 exceeds 10 μm, the body may be broken.

Inventive Example

Sample chips that satisfy thicknesses tp of cover portions and thicknesses T1 of electrode layers shown in Table 1 were prepared, and a radial cracking and capacitance per unit volume for these sample chips were then evaluated and shown in Table 1. In this case, the sample chips were manufactured in a size of 0402 (length×width: 0.4 mm×0.2 mm), and a maximum size of the sample chips in the second direction was 0.44 mm or less, a maximum size of the sample chips in the first direction was 0.22 mm or less, and a maximum size of the sample chips in the third direction was 0.22 mm or less.

The thicknesses tp of the cover portions and the thicknesses T1 of the electrode layers were measured in cross-sections of the sample chips cut in the first and second directions at the centers of the sample chips in the third direction, the thicknesses tp of the cover portions shown in Table 1 were average values of values measured at ten points arranged at equal intervals, and the thicknesses T1 of the electrode layers were maximum thicknesses that were measured.

After 30 sample chips per Test No. were prepared, when the number of sample chips in which a radial cracking occurred after firing an external electrode is one or more, a radial cracking was shown as NG, and when there is no sample chip in which a radial cracking occurred after firing an external electrode, a radial cracking was shown as OK. As for whether or not the radial cracking has occurred, it was observed with an optical microscope whether there was a radial cracking from an active portion toward a cover portion and a margin portion in the cross-section of the sample chip cut in the first and second directions at the center of the sample chip in the third direction.

TABLE 1

| Test No. | tp (μm) | T1 (μm) | Radial cracking |
|---|---|---|---|
| 1* | 20 | 25 | NG |
| 2* | 17 | 23 | NG |
| 3 | 17 | 20 | OK |
| 4 | 15 | 15 | OK |
| 5 | 15 | 10 | OK |
| 6 | 14 | 5 | OK |
| 7* | 13 | 21 | NG |
| 8* | 12 | 15 | NG |

In Test Nos. 1, 2, 7, and 8 in which tp is less than 14 μm or T1 exceeds 20 μm, the radial cracking occurred. In addition, in Test No. 1 in which tp exceeds 17 μm, capacitance per unit volume was poor.

On the other hand, in Test Nos. 3 to 6 in which the average thickness tp of the cover portion is 14 to 17 μm and the maximum thickness T1 of the electrode layer is 5 to 20 μm as suggested in the present disclosure, the radial cracking did not occur, and capacitance per unit volume was also excellent.

Sample chips that satisfy average thicknesses tp of cover portions, maximum thicknesses T1 of electrode layers, maximum thickness T2 of the electrode layers at band portions, and thicknesses T3 of the electrode layers at corner portions shown in Table 2 were prepared, and triple point plating disconnection, high temperature acceleration reliability, and moisture resistance reliability were then evaluated and shown in Table 2. In this case, a manner of applying the electrode layer was a single applying manner or a double applying manner for each Test No. as shown in Table 2. In addition, the sample chips were manufactured in a size of 0402 (length×width: 0.4 mm×0.2 mm), and a maximum size of the sample chips in the second direction was 0.44 mm or less, a maximum size of the sample chips in the first direction was 0.22 mm or less, and a maximum size of the sample chips in the third direction was 0.22 mm or less.

In the triple point plating disconnection, the numbers of sample chips in which plating disconnections occurred at corners among 100 sample chips per Test No. were shown.

In the high temperature acceleration reliability, the numbers of sample chips in which an insulation resistance value is decreased to $\frac{1}{10}$ or less of an initial numerical value as a result of preparing 400 sample chips per Test No. and then applying a voltage that is 1.5 times the reference voltage of these sample chips to these sample chips at a temperature of 105° C. for 12 hours were shown.

In the moisture resistance reliability, the numbers of sample chips in which an insulation resistance value is decreased to $\frac{1}{10}$ or less of an initial numerical value as a result of preparing 400 sample chips per Test No. and then applying a voltage that is 1 times the reference voltage of these sample chips to these sample chips at a temperature of 85° C. and a relative humidity of 85% for 12 hours were shown.

TABLE 2

| Test No. | tp (μm) | T1 (μm) | T2 (μm) | T3 (μm) | T3/T1 | Triple Point Plating Disconnection | High Temperature Acceleration Reliability | Moisture Resistance Reliability | Applying Manner |
|---|---|---|---|---|---|---|---|---|---|
| 9 | 16 | 20 | 11 | 5 | 0.25 | 0/100 | 0/400 | 0/400 | Single |
| 10 | 16 | 15 | 8 | 2.5 | 0.17 | 1/100 | 0/400 | 0/400 | Double |
| 11 | 15 | 15 | 8 | 1.2 | 0.08 | 1/100 | 0/400 | 0/400 | Double |
| 12 | 15 | 15 | 8 | 0.4 | 0.03 | 60/100 | 1/400 | 3/400 | Single |
| 13 | 15 | 10 | 4 | 0.2 | 0.02 | 90/100 | 4/400 | 8/400 | Single |

It can be seen that in Test Nos. 9 to 11 in which T3 is 1.0 µm or more, the number of samples in which the triple point plating disconnection occurred is small and the high temperature acceleration reliability and the moisture resistance reliability are excellent, whereas in Test Nos. 12 and 13 in which T3 is less than 1.0 µm, the number of samples in which triple point plating disconnection occurred is large and the high temperature acceleration reliability and the moisture resistance reliability are poor.

In addition, it can be seen that in Test No. 9 in which T1 is 20 µm, it was possible to secure the moisture resistance reliability even in a manner of singly applying an external electrode, but comparing Test Nos. 10 to 13 in which T1 is 15 µm or less with each other, the high temperature acceleration reliability and the moisture resistance reliability may become poor in the manner of singly applying an external electrode.

As set forth above, according to an exemplary embodiment in the present disclosure, the radial cracking of the multilayer electronic component may be suppressed by adjusting thicknesses of the cover portion and the external electrode.

In addition, the moisture resistance reliability of the multilayer electronic component may be improved.

Further, the effective volume of the multilayer electronic component may be increased.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
 a body including a plurality of dielectric layers and having first and second surfaces opposing each other in a first direction, third and fourth surfaces connected to the first and second surfaces and opposing each other in a second direction, and fifth and sixth surfaces connected to the first to fourth surfaces and opposing each other in a third direction; and
 external electrodes disposed on the third and fourth surfaces, respectively, and each including an electrode layer, respectively,
 wherein the body includes an active portion including internal electrodes disposed alternately with the dielectric layers and cover portions disposed on upper and lower surfaces of the active portion in the first direction, respectively,
 in a cross-section of the body cut in the first and second directions in a center of the body in the third direction, an average thickness of the cover portion is in a range from 14 to 17 µm and a maximum thickness of the electrode layer is in a range from 5 to 20 µm, and
 a thickness of the electrode layer at a corner portion thereof is 1.0 µm or more.

2. The multilayer electronic component of claim 1, wherein the first and second electrode layers include a conductive metal and glass.

3. The multilayer electronic component of claim 2, wherein the external electrodes include a first external electrode including a first connection portion disposed on the third surface and a first band portion extending from the first connection portion to parts of the first and second surfaces and a second external electrode including a second connection portion disposed on the fourth surface and a second band portion extending from the second connection portion to parts of the first and second surfaces.

4. The multilayer electronic component of claim 3, wherein in the first band portion, a length from the third surface to a distal end of the first electrode layer is greater than a length from the third surface to a distal end of the second electrode layer.

5. The multilayer electronic component of claim 4, wherein in the first and second band portions, at least one point at which inclinations of tangent lines of the electrode layer are opposite to each other is disposed.

6. The multilayer electronic component of claim 3, wherein the second electrode layer is disposed to cover the corner portion which is a region in which the first band portion and the first connection portion are connected to each other.

7. The multilayer electronic component of claim 1, wherein the corner portion of the body has a rounded shape with and a radius of curvature in a range from 5 µm to 30 µm.

8. The multilayer electronic component of claim 3, wherein in the first band portion, a maximum thickness of the electrode layer is in a range from 5 µm to 12 µm.

9. The multilayer electronic component of claim 1, wherein a maximum size of the multilayer electronic component in the second direction is 1.1 mm or less and a maximum size of the multilayer electronic component in the third direction is 0.55 mm or less.

10. The multilayer electronic component of claim 1, wherein a maximum size of the multilayer electronic component in the second direction is 0.44 mm or less and a maximum size of the multilayer electronic component in the third direction is 0.22 mm or less.

11. The multilayer electronic component of claim 1, wherein an average thickness of the dielectric layers is 0.5 µm or less.

12. The multilayer electronic component of claim 1, wherein an average thickness of the internal electrodes is 0.5 µm or less.

13. The multilayer electronic component of claim 1, wherein the third and fourth surfaces have a concave shape.

14. The multilayer electronic component of claim 13, wherein a depth of the concave shape is in a range from 5 µm to 10 µm.

15. A multilayer electronic component, comprising:
 a body comprising an active portion comprising internal electrodes disposed alternately in a length-width plane with dielectric layers interposed therebetween, the internal electrodes and the dielectric layers being stacked in a thickness direction, and upper and lower cover portions disposed respectively above and below the active portion in the thickness direction;
 first and second external electrodes comprising electrode layers disposed on thickness-width external surfaces of the body, the electrode layers comprising first and second band portions extending from corresponding thickness-width external surfaces onto length-width external surfaces,
 wherein in the first and second band portions, at least one point at which inclinations of tangent lines of corresponding electrode layers are opposite to each other is disposed,
 a thickness of each of the electrode layers at a corner portion thereof is 1.0 µm or more, and
 in the first or second band portion, a length from the thickness-width external surface to a point having a maximum thickness of the electrode layer is greater than a length from the thickness-width external surface to the at least one point.

16. The multilayer electronic component of claim 15, wherein in a length-thickness cross-section of the body taken at a width-wise center of the body, an average thickness of the cover portion is in a range from 14 μm to 17 μm, and a maximum thickness of the electrode layers is in a range from 5 μm to 20 μm.

17. The multilayer electronic component of claim 15, wherein edges between thickness-width external surfaces of the body and length-width external surfaces of the body are rounded with a radius of curvature in a range from 5 μm to 30 μm.

18. The multilayer electronic component of claim 1, wherein the thickness of the second electrode layer is greater than the thickness of the first electrode layer.

19. The multilayer electronic component of claim 15, wherein the thickness of the second electrode layer is greater than the thickness of the first electrode layer.

\* \* \* \* \*